United States Patent
Smith

(12) 
(10) Patent No.: US 6,912,799 B1
(45) Date of Patent: Jul. 5, 2005

(54) MARKING AND SCORING GUIDE

(76) Inventor: Gregory S. Smith, 960 Choctaw Ridge, Holts Summit, MO (US) 65043

( * ) Notice: Subject to any disclaimer, the term of this patent is extended or adjusted under 35 U.S.C. 154(b) by 0 days.

(21) Appl. No.: 10/126,107

(22) Filed: Apr. 19, 2002

Related U.S. Application Data

(60) Provisional application No. 60/285,290, filed on Apr. 20, 2001.

(51) Int. Cl.[7] .................................................. G01B 3/10
(52) U.S. Cl. ............................ 33/770; 33/668; 33/760; 33/27.031; 33/42
(58) Field of Search ................. 33/770, 668, 759–760, 33/27.03, 27.031, 27.032, 42

(56) References Cited

U.S. PATENT DOCUMENTS

| | | | | |
|---|---|---|---|---|
| 3,021,599 A | * | 2/1962 | Odom ....................... 33/275 R |
| 4,103,426 A | * | 8/1978 | Robin ....................... 33/27.03 |
| 4,255,856 A | | 3/1981 | Mackie ........................ 30/293 |
| 4,353,167 A | * | 10/1982 | Martin ......................... 33/770 |
| 4,949,462 A | | 8/1990 | Spencer ....................... 30/293 |
| 4,999,924 A | * | 3/1991 | Shields ......................... 33/770 |
| 5,172,486 A | * | 12/1992 | Waldherr ...................... 33/770 |
| 5,231,764 A | | 8/1993 | Chang .......................... 30/293 |
| 5,289,637 A | | 3/1994 | Coffey .......................... 30/294 |
| 5,406,711 A | * | 4/1995 | Graham ......................... 33/42 |
| 5,542,184 A | | 8/1996 | Beard .......................... 30/293 |
| 5,782,007 A | * | 7/1998 | Harris ......................... 33/768 |
| 5,966,820 A | | 10/1999 | Cornacchio et al. .......... 30/286 |
| 5,979,063 A | | 11/1999 | Pritz ............................ 30/293 |
| 6,115,931 A | * | 9/2000 | Arcand ........................ 33/668 |
| 6,223,443 B1 | * | 5/2001 | Jacobs ....................... 33/27.03 |
| 6,289,594 B1 | * | 9/2001 | Wrobbel ........................ 33/42 |
| 6,295,739 B1 | | 10/2001 | Kraft ........................... 33/758 |

* cited by examiner

*Primary Examiner*—Christopher W. Fulton
*Assistant Examiner*—Yaritza Guadalupe
(74) *Attorney, Agent, or Firm*—Grace J. Fishel

(57) ABSTRACT

A guide for assisting in marking a measurement and/or scoring a sheet of drywall, paneling or other planar building material has a bore for receiving a pencil or other marker and has a slot for receiving a scoring blade therethrough. The guide may have a support for maintaining the pencil, marker or a knife having a scoring blade, in a steady relationship with the surface to be scored or marked. The guide may have a curvature or curvatures for cooperating with the pencil, marker or knife. The guide may also have an attaching structure, such as a flange or slot, to attach the guide to a measuring device, including a retractable carpenter's tape, combination square or other rule.

11 Claims, 5 Drawing Sheets

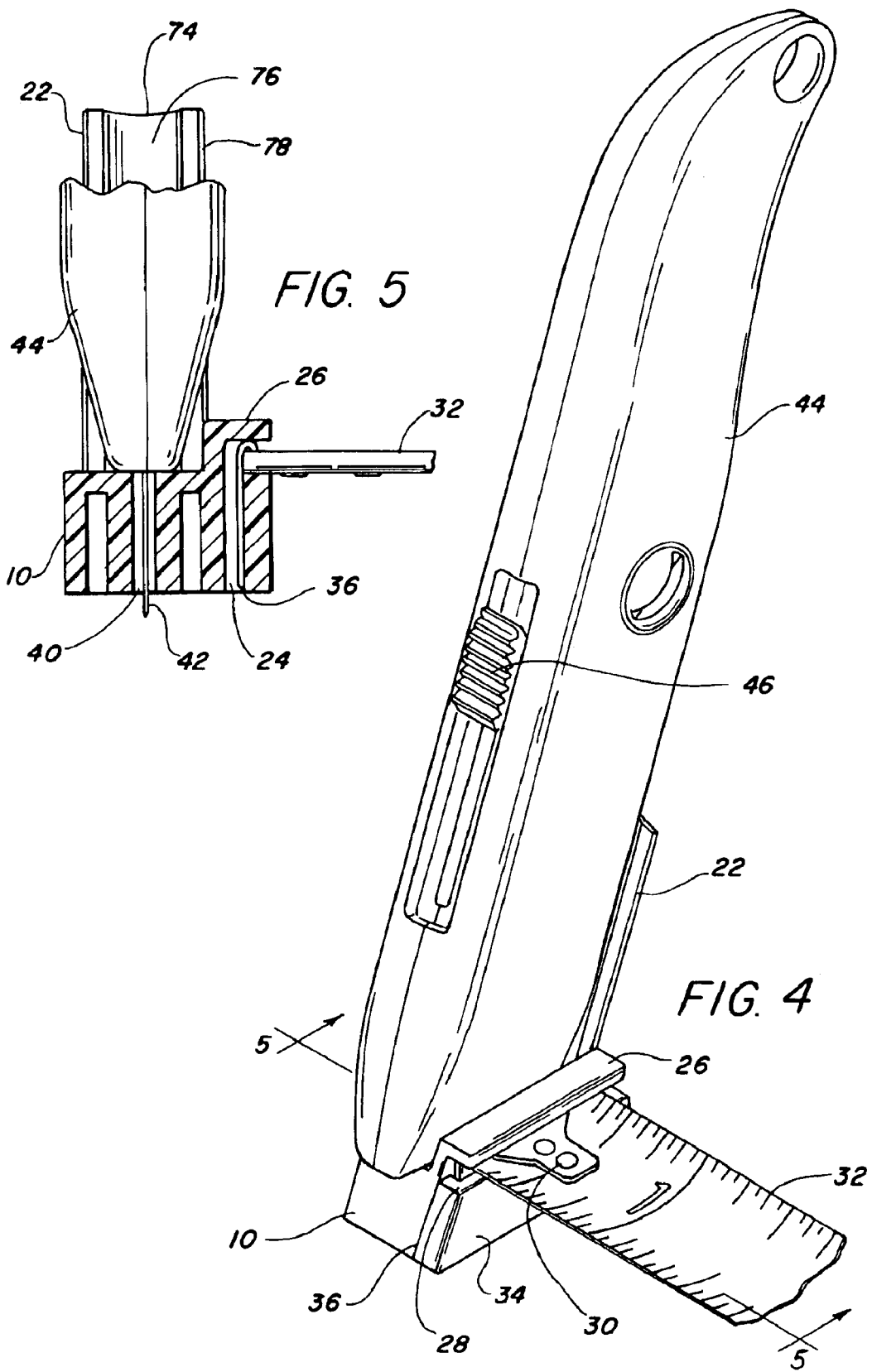

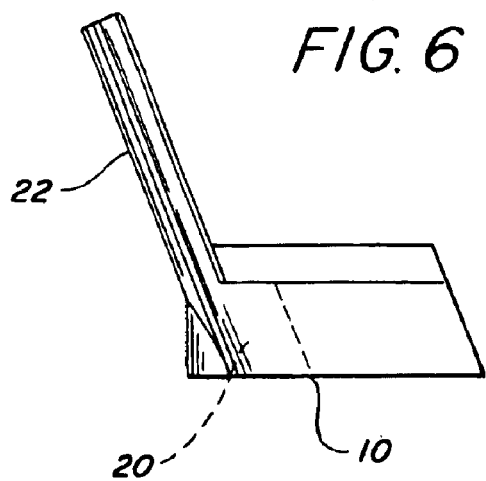
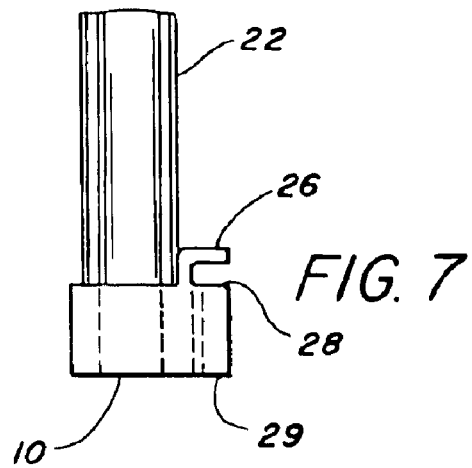
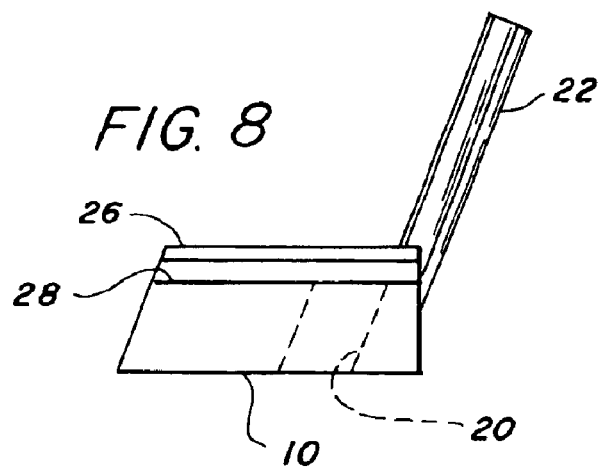
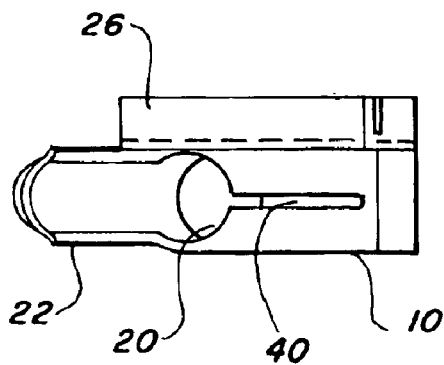
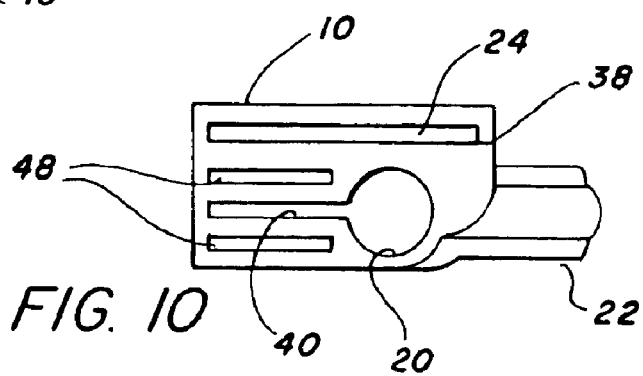

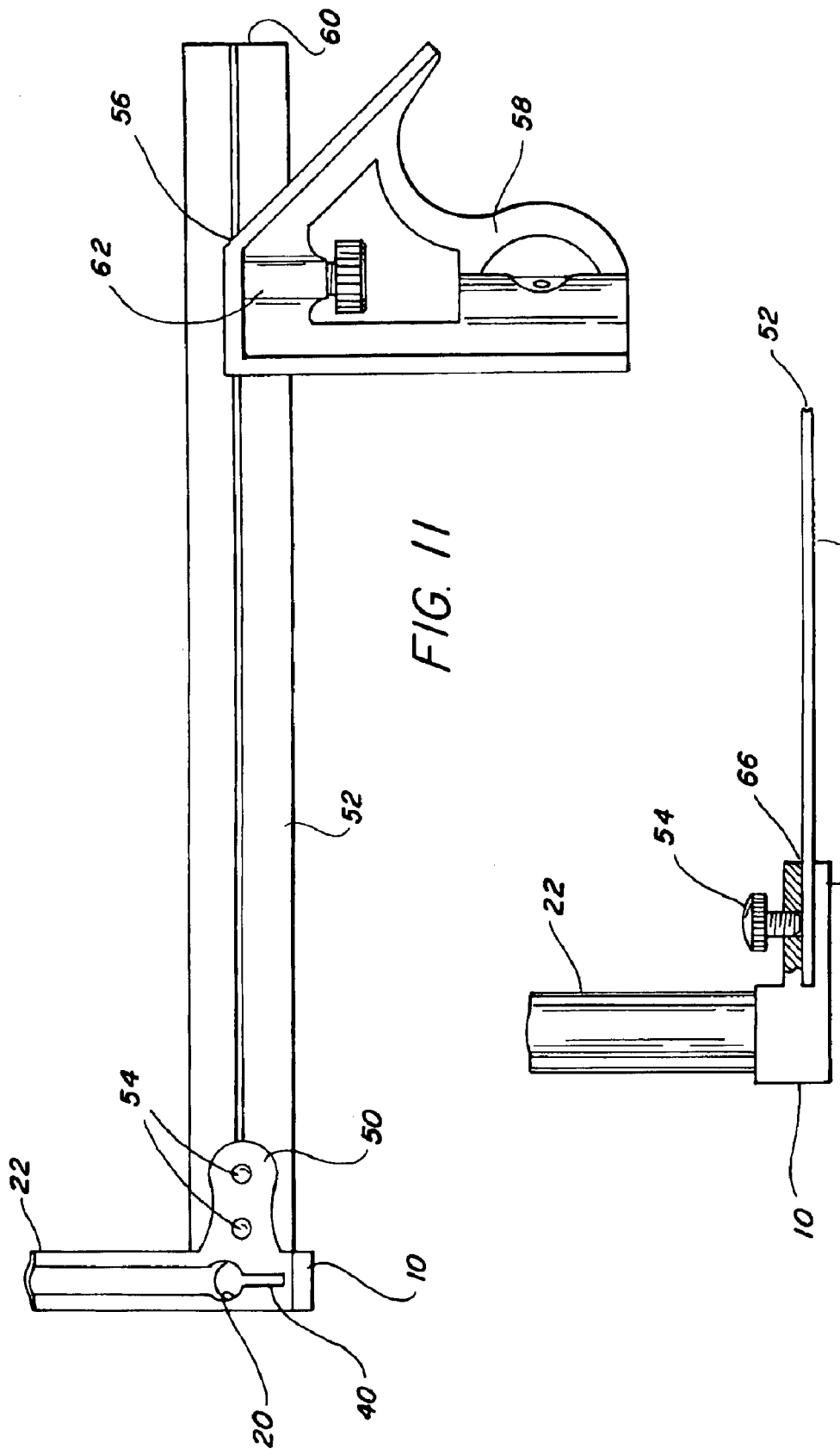

MARKING AND SCORING GUIDE

This application claims priority from provisional application Ser. No. 60/285,290, filed Apr. 20, 2001, for Retractable Tape Measure Device Attachment.

BACKGROUND OF THE INVENTION

1. Field of the Invention

The present invention relates to a guide for use in marking or scoring drywall, paneling or the like. The guide securely holds a marker or utility knife at an appropriate angle to mark or score the material.

2. Brief Description of the Prior Art

Drywall, paneling and other sheet building materials come in standard sizes and shapes. Panels of the material are cut to fit before they are installed on a wall or ceiling. In the case of drywall, a straight cut is made on the face side of the sheet with a utility knife or the like held at a right angle to the sheet. The score should be completely through the face paper and part way into the core. The core is then broken by snapping or bending the sheet away from the scored paper side. With the partially separated portion folded back, the exposed backing paper is cut with the knife. On the face side of the board, the location of holes for electrical outlets and other openings are marked. Holes are then drilled at the corners of the openings and a knife or saw used to remove the piece to be detached. Paneling or other sheet building materials are marked with straight lines and cut with a saw.

In construction, a score or mark is made by a worker using a retractable measuring tape with a slide lock in one hand and a pencil or utility knife in the other. The user runs the measuring tape, locked to a length, along a side edge of the panel with one hand, while the other hand operates a pencil or knife making a line or score parallel to the side edge of the panel. During this operation, the worker gives the rule a slight twist and pinches the pencil or knife against an L-shaped tab which is found on the end of a conventional steel measuring tape. In practice, it is nearly impossible to keep the pencil or knife perpendicular to the sheet and make a completely straight line or score.

There are devices which offer partial solutions to the above-mentioned problem. Representative ones of which are described in the following U.S. patents which are incorporated by reference herein: U.S. Pat. Nos. 4,255,856, 4,949,462, 5,231,764, 5,289,637, 5,542,184, 5,966,820, 5,979,063 and 6,295,739.

BRIEF SUMMARY OF THE INVENTION

This invention provides a guide for marking and scoring drywall and the like. The guide includes a holder for a pen, pencil or other marker. The holder also receives and holds a utility knife or other scoring device. The holder is formed with a support for maintaining the marker or scorer in a secure, steady relationship with the holder and with the drywall or other sheet building material which is being marked or scored.

The support maintains the marker, or the scorer, in a secure, steady relationship with the holder while providing an access for the marker, or the scorer, to contact the drywall or the like. The holder may include additional structure to cooperate with measuring devices such as a carpenter's square or a combination square, as disclosed herein.

It is thus an object of this invention to provide a guide which supports a marker and/or a scorer during marking or scoring of a pattern on a surface. It is a further object to provide a guide which has a support for holding a marker and/or a scorer in a secure, steady relationship to the surface being marked and/or scored. Other objects and features of the invention will be in part apparent and in part pointed out hereinafter.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 1 is a perspective view, partially broken, showing a guide of the invention in use with a carpenter's retractable measuring tape to mark a sheet of drywall or the like;

FIG. 4 is a perspective view of a guide of the invention cooperating with a scorer and a carpenter's rule;

FIG. 5 is a cross-sectional view taken along the plane 5—5 in FIG. 4;

FIG. 6 is a left side view of a guide of the invention;

FIG. 7 is a front view of the guide of the invention shown in FIG. 6;

FIG. 8 is a right side view of the guide of the invention shown in FIG. 6;

FIG. 9 is a top plan view of the guide of the invention shown in FIG. 6;

FIG. 10 is a bottom plan view of the guide of the invention shown in FIG. 6;

FIG. 11 is a top plan view of a further embodiment of the invention; and,

FIG. 12 is a left side view of another further embodiment of the invention.

DETAILED DESCRIPTION OF THE INVENTION

Figure 1:
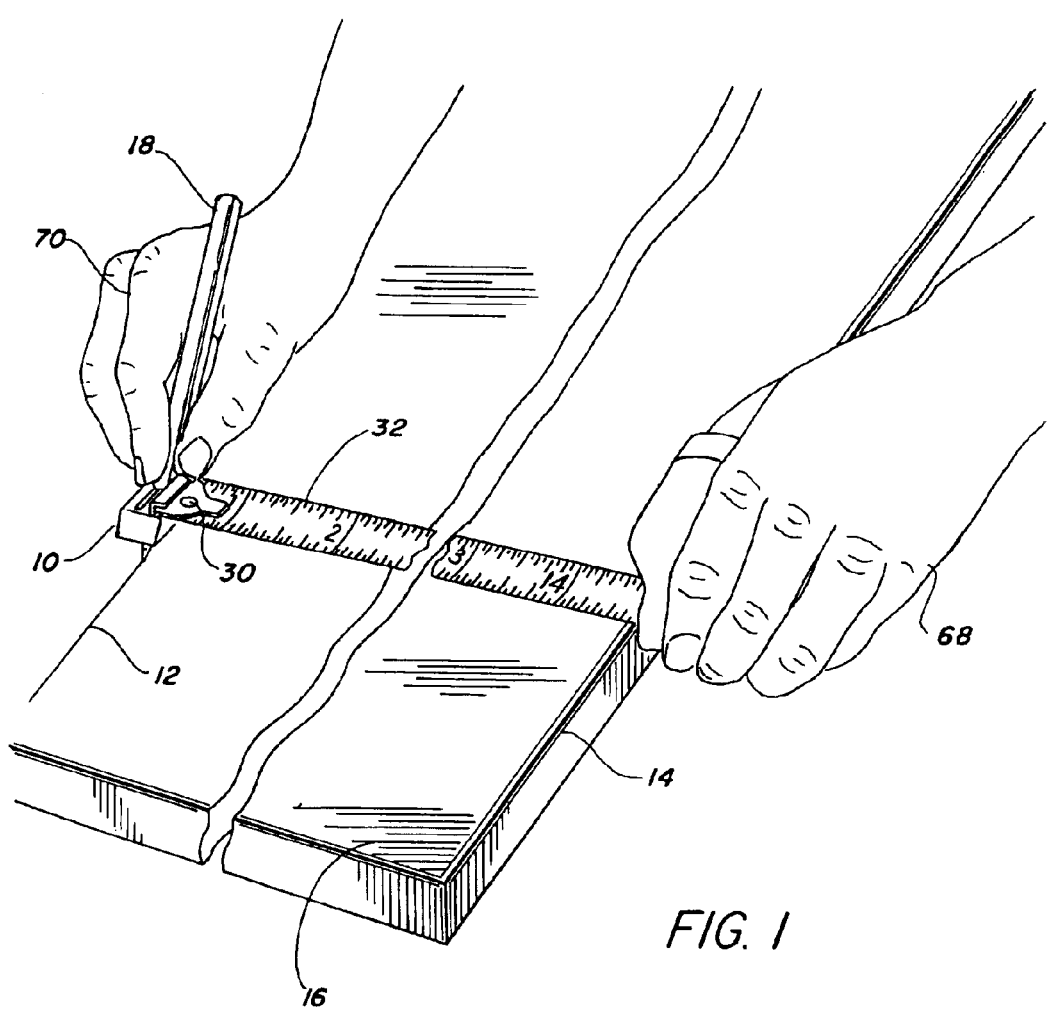
Figure 3:
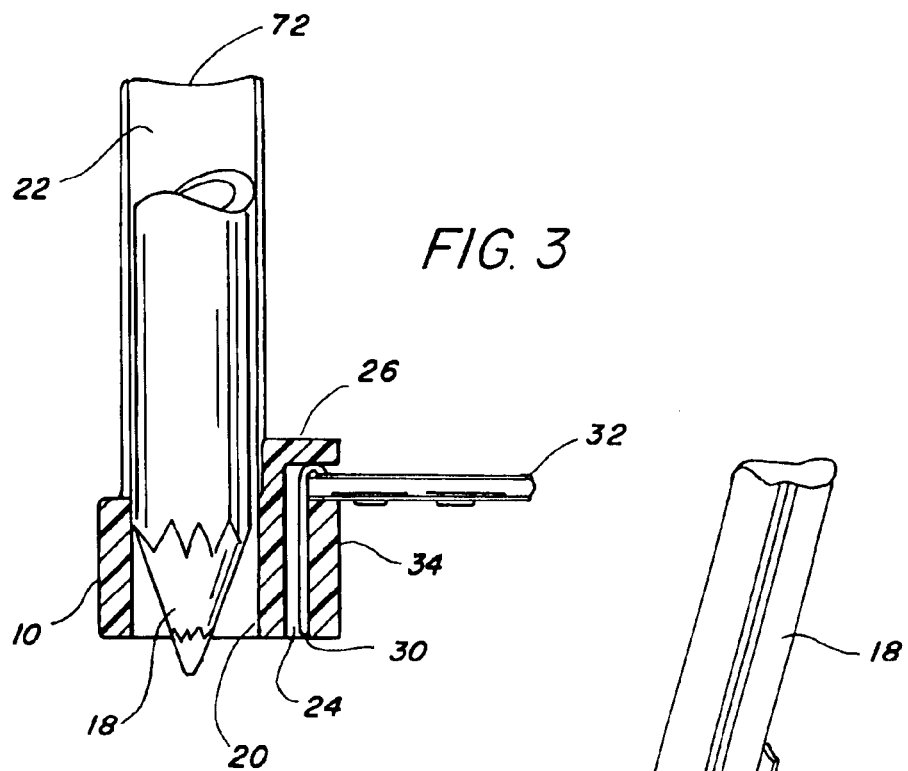
FIG. 3 is a cross-sectional view taken along the plane 3—3 in FIG. 2.
Figure 2:
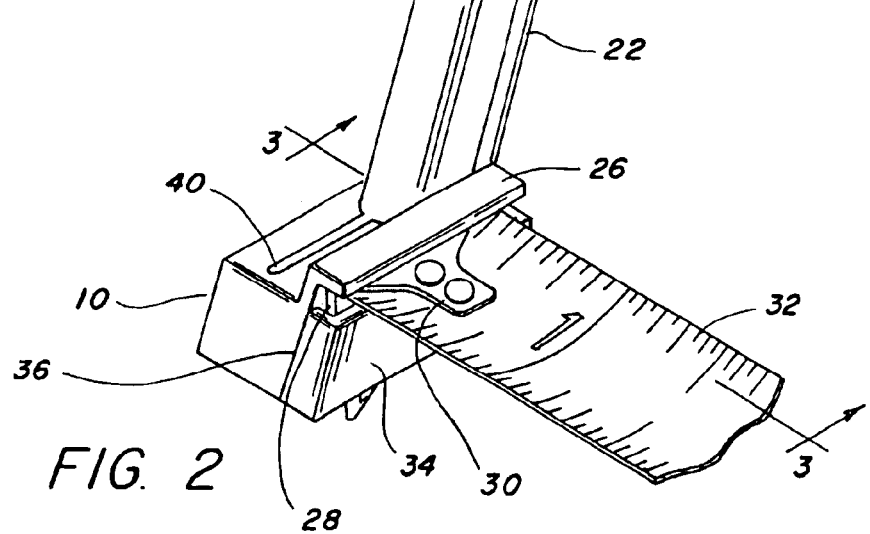
FIG. 2 is a perspective view of a guide of the invention cooperating with a pencil and a carpenter's rule.

Referring to FIGS. 1, 2, and 3, a guide 10 according to the invention is shown in use to mark or score a line 12 parallel to an edge 14 of a standard panel or sheet of drywall 16. As shown, a pencil 18 is placed in a bore 20 of guide 10. Pencil 18 is held firmly against a support 22 provided in guide 10.

As shown in FIG. 3, guide 10 has a longitudinal slot 24 therein. As shown, slot 24 has a lip 26 covering an upper edge 28 (FIG. 7) of slot 24. Slot 24 also has a lower edge 29 (FIG. 7), as described further herein. Slot 24 is adapted to receive an L-shaped tab 30 of a carpenter's retractable tape 32. Preferably, the fit of tab 30 in slot 24 is snug. Lip 26 may resiliently bear against tab 30, as shown, when tab 30 is snapped into slot 24.

As shown in FIG. 2, a front portion of wall 34 of slot 24 may be discontinuous at 36 to provide a slot through which tab 30 of the carpenter's tape 32 may be slid into slot 24. Alternatively as shown in FIG. 10, wall 34 of slot 24 could be made discontinuous at rear portion 38 of guide 10. Wall 34 can also be made as a separate part, not shown, which snaps onto guide 10 with tab 30 of carpenter's tape 32 captured in slot 24, i.e. between wall 34 and the remaining body of guide 10.

As shown in FIGS. 2, 5, 9 and 10, guide 10 has a longitudinal slot 40 extending through the body of guide 10.

Longitudinal slot 40 communicates with bore 20, as shown. Longitudinal slot 40 receives a blade 42 of a scorer such as a utility knife 44, as shown in FIGS. 4 and 5. Longitudinal slot 40 may be narrow, if desired, to provide a snug fit against blade 42 of utility knife 44 to further steady knife 44 when the guide is used to produce a score. The extension of blade 42 of utility knife 44 through longitudinal slot 40 may be adjusted by an adjustment mechanism 46 provided in utility knife 44, as is known in the art.

As shown in FIG. 10, guide 10 may have relieved grooves 48 which reduce the amount of material needed to form guide 10. Guide 10 may be formed of conventional materials, such as metal or plastic. Guide 10 may be formed by a variety of methods, including conventional machining, molding and casting. Injection molding, or other plastic working techniques, for conventional plastic materials such as polypropylene, polyethylene or acrylics, produce inexpensive and reliable devices.

FIGS. 11 and 12 show alternative embodiments of the guide of the invention. Lower edge 29 of slot 24 has a transversely extending shelf 50, as shown in FIG. 11 taken with FIG. 7. Shelf 50 may be joined to a measuring device, such as a blade 52 by a fastener or fasteners 54, as shown. Fastener or fasteners 54 may be readily removable, such as set screws and the like, or may be more permanent, such as rivets, screws, welds, adhesives and the like. As shown, blade 52 may be snugly received in a slot 56 of a combination square 58, as shown. The placement of blade 52 along slot 56 of combination square 58 is adjustable with the adjustment being held by friction between blade 52 and slot 56 of combination square 58. The adjustment may also be held more securely by a spring latch or set screw mechanism 62, or the like.

In FIG. 12, guide 10 has a longitudinally extending shelf 64 at the rear of guide 10. Shelf 64 may be bifurcated so that blade 52 may be received in slot 66 of shelf 64 and joined thereto by fasteners 54, as previously described for FIG. 11.

Use of the Marking and Scoring Guide

The use of the marking and scoring guide is shown in FIGS. 1 through 5, 11 and 12. As shown in FIG. 1, the guide is used to mark a section of a panel of drywall 16. As shown in FIGS. 2 through 5, tab 30 of a carpenter's retractable measuring tape 32 is captured in slot 24 of guide 10. It will be appreciated that the structures shown in FIGS. 11 and 12 may also be used. The desired measurement is held on blade 52 or tape 32 for example, by the user's left hand 68, by a stop or latch on retractable tape 32 or combination square 58, previously described. Pencil 18 is fictionally received in bore 20 and held against support 22 by the user's right hand 70, as shown. Bore 20 may be tapered to hold pencil 18 firmly in guide 10 and to present an appropriate amount of the tip of pencil 18 to produce the desired mark. Guide 10 as illustrated in the drawings is for right handed use, a mirror image of guide 10 is for left handed use. As the user moves guide 10 along the surface of drywall 16, retractable tape 32 or combination square 58 is held in the user's left hand 68 against edge 14 of drywall 16. As guide 10 moves, pencil 18 produces the desired mark 12.

The action of the guide to produce a score is similar to that described above for producing a mark 12. As shown in FIGS. 4 and 5, a scorer such as utility knife 44, is placed in guide 10 with blade 42 received through transverse slot 40. Blade 42 is extended by adjustment mechanism 46 to provide enough depth of cut for the desired score. Utility knife 44 is held firmly against support 22 and guide 10 is passed over drywall 16, as described above, to make the desired score.

As shown in FIG. 3, support 22 may have a curvature 72 about its longitudinal axis. This curvature 72 at least partially matches the curvature of a typical pencil 18 or marker and assists in holding pencil 18 or marker in a fixed orientation in relation to the surface of a panel of drywall 16 during the marking operation. As shown in FIG. 5, the curvature may be a compound curvature 74. A central or inner portion 76 at least partially matches the circumference of typical pencil 18 or marker and the curvature of an outer or peripheral portions 78 at least partially matches the curvature of the handle of utility knife 44. The conforming structure of the support 22, as shown in FIGS. 3 and 5, can assist in holding pencil 18 steady and at a right angle to the plane of the sheet of material being marked and can assist in holding a scorer, such as a utility knife 44 steady as well.

As shown in the drawings, support 22 has a slight angle of inclination with respect to the vertical. The longitudinal axis of bore 20 is also shown as having such an inclination. The magnitude of the inclination is not critical, and the bore and support may be oriented at an opposite angle, substantially vertically or more steeply, if desired. The inclination should not cause the pencil 18 or marker, or a scorer 44, to slip in relation to the support 22 when the guide is in use. The confining taper of bore 20, and the snug fit of slot 40, if used, assist in holding pencil 18 or utility knife 44 securely in guide 10 during its use.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A guide for guiding a marker or a scorer for marking or scoring planar sheet materials, the guide comprising a body, the body having a bore therethrough, the bore extending through the body, the bore being adapted to receive a marker therein and to retain the marker in a position to mark a surface on which the guide is placed, the body having a longitudinal slot therein, the longitudinal slot extending through the body and communicating with the bore, the longitudinal slot and the bore being adapted to receive a blade of a scorer therethrough and to retain the blade in position to score a surface on which the guide is placed, the body having an attachment for connecting the body to a measurer said body further having a support with a longitudinal axis in alignment with the longitudinal slot adjacent to the bore and extending upwardly therefrom, the support being adapted to contact a marker or a scorer and to support a marker or a scorer in a predetermined angled relationship to a surface to be marked or scored.

2. The guide of claim 1 wherein the support has a curvature about its longitudinal axis, the curvature at least partially conforming to a portion of a surface of a marker or a scorer.

3. The guide of claim 1 wherein the attachment is adapted to releasably connect the guide to a measurer.

4. The guide of claim 1 wherein the attachment includes a flange extending outwardly from the body for connection to a measurer.

5. The guide of claim 1 wherein the attachment is adapted to releasably connect the guide to a measurer which is a carpenter's retractable rule.

6. The guide of claim 1 wherein the attachment is adapted to releasably connect the guide to a measurer which is a carpenter's retractable rule and the rule has a lock for setting a measurement for a mark or a score.

7. The guide of claim 1 wherein the attachment is adapted to releasably connect the guide to a measurer which is a combination square with a blade.

8. The guide of claim 1 wherein the body has a longitudinally extending wall spaced from the body and connected thereto, the body and wall being adapted to snugly receive a tab of a carpenter's retractable tape therein, the body having a horizontally extending lip at least partially extending above the wall, the lip being adapted to at least partially retain the tab of a carpenter's retractable tape between the body and the wall.

9. A guide for guiding a marker or a scorer for marking or scoring of planar forms, the guide comprising a body, the body having a bore therethrough, the bore extending substantially vertically through the body, the bore being adapted to receive a marker therein and to retain the marker in position to mark a surface on which the guide is placed, the body having a longitudinal slot therein, the longitudinal slot extending vertically through the body and communicating with the bore, the longitudinal slot and the bore being adapted to receive the blade of a scorer therethrough and to retain the blade in position to score a surface on which the guide is placed, the body having a support with a longitudinal axis in alignment with the longitudinal slot adjacent to the bore and extending upwardly therefrom, the support being adapted to contact a marker or a scorer and to support a marker or a scorer in a predetermined angled relationship to a surface to be marked or scored, the body having an attachment for connecting the body to a measurer.

10. The guide of claim 9 wherein the support has a compound curvature about its longitudinal axis.

11. The guide of claim 9 wherein the support has a central area having a first curvature and peripheral areas having a second curvature.

* * * * *